United States Patent
Sridharan et al.

(10) Patent No.: US 7,523,149 B1
(45) Date of Patent: Apr. 21, 2009

(54) SYSTEM AND METHOD FOR CONTINUOUS PROTECTION OF WORKING SET DATA USING A LOCAL INDEPENDENT STAGING DEVICE

(75) Inventors: Srineet Sridharan, Pune (IN); Mugdha Srineet, Pune (IN)

(73) Assignee: Symantec Operating Corporation, Cupertino, CA (US)

( * ) Notice: Subject to any disclaimer, the term of this patent is extended or adjusted under 35 U.S.C. 154(b) by 248 days.

(21) Appl. No.: 11/439,083

(22) Filed: May 23, 2006

(51) Int. Cl.
*G06F 17/30* (2006.01)
(52) U.S. Cl. .............. 707/204; 707/101; 707/102; 707/103 R; 707/201; 707/205
(58) Field of Classification Search .............. 707/1–10, 707/100–104.1, 200–206
See application file for complete search history.

(56) References Cited

U.S. PATENT DOCUMENTS 5,193,154 A * 3/1993 Kitajima et al. ............. 707/204

2005/0193031 A1 * 9/2005 Midgley et al. ............. 707/200

OTHER PUBLICATIONS

"Veritas Backup Exec™ 9.1 for Windows Servers"; Datasheet; Veritas Software Corporation, Nov. 11, 2003.
"GoodFiles.com—Jump Vault: A Unique Backup System for USB Flash Drives"; 'Internet; Apr. 4, 2006; http://www.goodfiles.com/viewapp.asp?app=backup_utilities/jump_vault.xml.
"NTI Shadow"; Review by PC Magazine; Nov. 17, 2005; http://www.pcmag.com/article2/0,1895,1887868,00.asp.
"LiveBackup Makes Sure There's Always a Copy"; Review by PC Magazine; May 7, 2002; http://www.pcmag.com/article2/0,1217,a-25310,00.asp.

* cited by examiner

*Primary Examiner*—Isaac M Woo
(74) *Attorney, Agent, or Firm*—Meyertons Hood Kivlin Kowert & Goetzel, P.C.

(57) ABSTRACT

A system for continuous protection of working set data comprises a primary host (such as a laptop or a desktop), a peripheral memory device (such as a flash memory device or "memory stick") and a working set protection manager. The working set protection manager is configured to detect an operation performed on a data object at the primary host and store a record associated with the operation at the peripheral memory device. In addition, in response to a detection of a backup operation from the primary host to a secondary backup device, the working set protection manager is configured to mark the record for deletion from the peripheral memory device.

27 Claims, 7 Drawing Sheets

SYSTEM AND METHOD FOR CONTINUOUS PROTECTION OF WORKING SET DATA USING A LOCAL INDEPENDENT STAGING DEVICE

BACKGROUND OF THE INVENTION

1. Field of the Invention

This invention relates to computer systems and, more particularly, to protection of data objects of a primary computing device at one or more other devices including a peripheral memory device.

2. Description of the Related Art

The computing infrastructure of a modern enterprise may include thousands of computing devices, which may range in complexity from clustered multiprocessor servers at the high end to relatively simple hand-held devices at the low end. At any given point in time, a large number of the computing devices may hold data objects containing information such as sales presentations, project plans, product designs, source code, and so on, that may be critical to the success of one or more organizational units. A number of different types of data protection techniques have traditionally been implemented in order to enable recovery of the data objects from various types of failure situations, such as a system crash, sustained loss of electrical power, an attack by malicious software such as a virus, or a natural disaster such as a hurricane, tornado, flood or fire. For example, automated backups to secondary storage may be scheduled at regular intervals (e.g., once every day) from servers, desktops and laptops that are connected to a corporate network, and periodic replication of mission-critical portions of the data to geographically remote locations may be organized for disaster recovery.

Traditional automated backup operations often require the primary system (e.g., a laptop or desktop computer whose data objects are to be backed up) to be connected to a network (e.g., a corporate intranet) during backup: for example, the secondary backup device to which the data is backed up may be linked to the primary system via a network, and/or at least part of the software responsible for performing the backup may be executed at a backup manager that is linked to the primary system via a network. During time windows when a primary system (such as a laptop being used for a business trip) does not have connectivity to the network on which its automated backups are usually performed, the data stored at the primary system may be vulnerable to failures. Of course, the user of the primary system may manually initiate the creation of a backup copy of an important data object while the primary is disconnected from the network, e.g., to a writeable compact disc (CD) or writable digital video disc (DVD) device attached to the primary system. However, manual backup procedures that depend on users to remember to identify the data objects that should be protected, and on the users' technical ability to correctly create and safeguard backup versions of the identified data objects, cannot generally be relied upon by corporate information technology (IT) organizations.

In addition to the problem of time windows during which network-based backups may not be feasible, traditional backup techniques may also suffer from additional deficiencies. For example, in performing a task such as preparing a presentation for a customer briefing, a user of a primary system may utilize a set of documents or files. The user may update some of the documents of the set, and perform only read operations to reference other documents of the set. From the point of view of the user, in the event of a failure such as a disk crash, it may be important to be able to quickly recover all the documents of the set, including the ones that were referenced but not updated. Unfortunately, traditional backup techniques are often oriented largely towards protecting data affected by update operations: e.g., when a backup is performed, only the changes made to one or more data objects since the previous backup may be saved in some backup techniques. As a result, quickly recovering the entire set of documents needed for the user's task, including documents that have only been read (but not necessarily written) in the recent past, may be difficult using some traditional backup techniques.

SUMMARY

Various embodiments of systems and methods for continuous protection of working set data are disclosed. According to one embodiment, a system comprises a primary host (such as a laptop or a desktop), a peripheral memory device (such as a flash memory device or "memory stick") and a working set protection manager. The peripheral memory device may be accessible from the primary host but may have independent failure/availability characteristics with respect to the primary host, so that for example a failure at the primary host such as a disk crash may not affect availability of objects stored at the peripheral memory device. In addition, in some embodiments the peripheral memory device may provide efficient, uniform I/O performance to any part of its address space: e.g., the response time for writing to any address at the peripheral memory device may not vary with the address. Any of a wide variety of relatively inexpensive peripheral memory devices may be used in different embodiments, such as flash memory devices or other solid-state memory devices connected to the primary host via Universal Serial Bus (USB) ports or IEEE 1394 (Firewire) ports, devices connected via wireless protocols to the primary host, or memory incorporated within mobile phones, cameras, or other devices that may be used primarily for functions other than computing.

The working set protection manager may be configured to detect an operation (e.g., a read or write I/O operation) performed on a data object such as a file at the primary host, and store a record associated with the operation at the peripheral memory device. For example, in response to detecting a creation or a deletion of a file, a copy of the file may be stored as a record at the peripheral memory device in one implementation. Records may be stored at the peripheral memory device even during periods when the primary host is disconnected from a network through which backups of the primary host to secondary backup devices (such as disks or tape) may be performed. The detection of an operation may identify the data object as being a member of a "working set" at the primary host—e.g., the set of data objects that are used at the primary host to perform one or more tasks between two successive backups to a secondary backup device from the primary host. The working set may be recoverable using one or more of the records stored at the peripheral memory device by the working set protection manager. Records may be generated, updated and/or stored at the peripheral memory device based on a variety of different triggering conditions in different embodiments, such as a detection of a file open, create, read, write, delete, save or close operation, or a determination that a specified amount of time has passed since a previous record for the same data object was stored at the peripheral memory device. The peripheral memory device may comprise a relatively small amount of memory (especially when compared to secondary backup devices and/or to the total storage accessible from the primary host), and records stored at the peripheral memory device may therefore have to be deleted or reclaimed from time to time. The working set protection manager may be configured to mark a record for deletion from the peripheral memory device in response to detecting a backup operation from the primary host to a secondary backup device. The occurrence of the backup may indicate, for example, that one or more objects of the working set are now safely protected at the secondary backup device, and do not need to be retained at the peripheral memory device. In some embodiments the working set protection manager may be configured to verify, prior to marking a record for deletion, that a backup of changes represented by the record has been created at a secondary backup device. The marked records may be deleted asynchronously in some embodiments, e.g., records marked for deletion may not actually be deleted until a threshold level of memory at the peripheral device is determined to be "dirty" or full of marked records. A plurality of records corresponding to different versions of a given data object may be stored at the peripheral memory device in some embodiments.

By saving records at the peripheral memory device automatically in response to detected operations, the working set protection manager may ensure that data objects that may be needed to perform tasks at the primary host are continuously protected and can be restored on short notice, even during time periods when secondary backup devices are inaccessible from the primary host. The set of objects protected may include objects that are only read (and not necessarily written to) at the primary host in some embodiments. At the same time, by reclaiming memory at the peripheral memory device in response to detecting backup operations to secondary storage, the working set protection manager may ensure that the total amount of memory needed to provide working set protection is not excessive, thus supporting continuous data protection at relatively low cost. The data protection may be transparent to users of the primary host in some embodiments, e.g., users may be unaware of the operations of the working set protection manager during normal operation, and may not be required to schedule or request backup operations to the peripheral memory device. In other embodiments, users may be allowed to control various aspects of the functionality of the working set protection manager, e.g., by specifying configuration parameters and/or policies.

In some embodiments, the working set protection manager may be configured to associate respective retention priorities with records stored at the peripheral memory device. For example, in one implementation where multiple records corresponding to a given data object are stored at the peripheral memory device over time, older records may be assigned lower retention priorities than newer records. When memory for a particular record has to be reclaimed, records with lower retention priorities may be chosen for reclamation in preference to records with higher retention priorities. The assignment of retention priorities to records may be independent of the marking of the records for deletion in some embodiments; e.g., records may be assigned retention priorities based on the type of triggering events that led to their creation, independently of whether the records have yet been marked for deletion or not. The working set protection manager may be implemented at any of a variety of layers of a storage software stack in different embodiments; for example, in one embodiment, at least a portion of the working set protection manager may be implemented as a file system filter driver.

Figure 1:
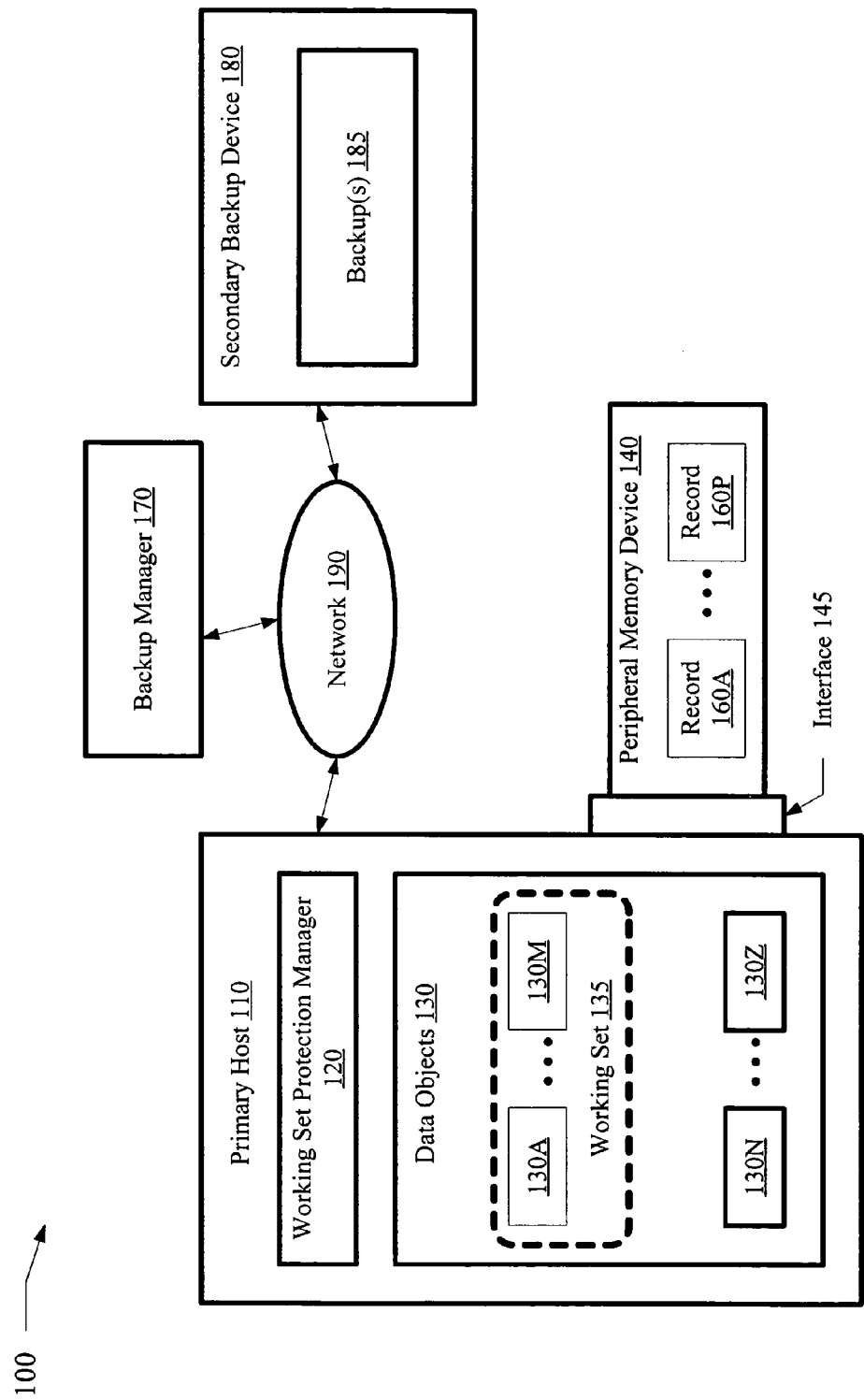
FIG. 1 is a block diagram illustrating one embodiment of a system.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

FIG. 1 is a block diagram illustrating a system 100 according to one embodiment. As shown, system 100 includes a primary host 110, a peripheral memory device 140 connected via an interface 145 to the primary host, and a secondary backup device 180. The primary host 110 (e.g., a laptop or a desktop) may include or have access to a plurality of data objects 130, e.g., data objects 130A-130Z that can be read, written and/or executed by users of the primary host 110. Data objects 130 may, for example, include files organized in directories or folders within one or more file systems or logical volumes, e-mail messages, database records, saved web pages or saved search results, or any other types of objects that can be manipulated, referenced or executed to perform various business and/or personal tasks. A backup manager 170 may be configured to back up some or all of the data objects 130 to secondary backup device 180, e.g., according to a configurable schedule or in response to explicit backup requests from a user or administrator. Backup manager 170 may be configured to implement any combination of a variety of different backup techniques in various embodiments. For example, in one embodiment, the backup manager 170 may be configured to perform full backups (in which a complete copy of selected data objects 130 is stored at secondary backup device 180) after specified time intervals (e.g., once a week) and incremental backups (in which only changes made to data objects 130 since the previous full or incremental backup are saved to the secondary backup device 180) between the full backups (e.g., once a day); in other embodiments, only full backups may be performed. In some embodiments, the primary host 110 may have to be connected via a network 190 to secondary backup device 180 and/or to backup manager 170 in order for backup manager 170 to back up data objects 130: e.g., during time periods when the primary host 110 does not have connectivity to network 190, backup manager 170 may not be able to perform scheduled or requested backups to secondary backup device 180.

As shown, primary host 110 may include a working set protection manager 120 (which may also be referred to herein as WSPM 120). In collaboration with backup manager 170, WSPM 120 may be configured to provide continuous data protection for a working set 135 of data objects 130. A "working set" 135, as used herein, refers to a set of data objects 130 that have been used to perform one or more tasks at a primary host 110 since a backup to a secondary backup device 180 was last performed. For example, in one embodiment, a data object 130 may be considered part of a working set 135 if it has been created, modified, or read since the last backup. In another embodiment, data objects that have been executed since the last backup may also be included within working set 135. In one example scenario, primary host 110 may be a laptop computer, and backup manager 170 may have performed a backup (either full or incremental) on a file system or drive "C:\" of the laptop 110 at 1:00 am on Apr. 4, 2006 while the laptop was connected to an intranet of a corporation at the corporation's headquarters in city C1. In the example scenario, the laptop 110 is provided for business use by an employee E1 working for the corporation, where E1's job responsibilities may include preparing and delivering sales presentations at various customer sites, including a presentation scheduled for 4:00 pm on Apr. 6, 2006 in a different city C2. Employee E1 may need the laptop 110 for preparing and delivering the presentation, and so may unplug or disconnect the laptop 110 from the corporate intranet on the morning of Apr. 5, 2006 for a business trip to city C2. During the time that the laptop 110 is disconnected from the intranet, employee E1 may perform a variety of tasks using data objects 130 on the laptop, such as updating a slide presentation located on drive C:\ after reading contents of one or more memoranda or white papers saved on C:\, and the like. The data objects 130 representing the slide presentation (written to by E1), the memoranda and white papers (read but not written by E1) may each be included in working set 135 in this example scenario. If the disk corresponding to C:\ were somehow to be damaged before E1's scheduled presentation (e.g., at 2:00 pm on Apr. 5, 2006, shortly before the scheduled 4:00 pm presentation), E1 may need to quickly recover access to all the data objects of the working set, and may use restoration/recovery services provided by WSPM 120 in order to do so. In some embodiments, executable objects (such as the executable files corresponding to a word processor, a presentation development tool, or a web browser) used by E1 since the last backup may also be included within working set 135. It is noted that in some embodiments, a user may explicitly identify one or more of the data objects 130 to be protected (or excluded from protection) using records 160 at the peripheral memory device 140—e.g., the user may indicate to the WSPM 120 via a configuration setting that any objects within a "C:\work\April_6_Sales_Meeting" directory are to be protected using the peripheral memory device, and/or that objects within "C:\temp" are not to be protected. As described below in further detail in conjunction with the description of FIG. 2, a working set 135 for a given primary host 110 may increase in size between successive backups performed by backup manager 170 in some embodiments, and the size of the working set 135 may be reduced (e.g., to zero) whenever backup manager performs the next backup.

In the embodiment depicted in FIG. 1, the WSPM 120 may be configured to detect operations (such as input/output operations or create/delete operations) performed on data objects 130 at primary host 110, and store one or more records 160 (e.g., 160A-160P) corresponding to the detected operations at peripheral memory device 140. The detected operations may be used to identify data objects 130 that form the working set 135 in such an embodiment; e.g., if a read or a write I/O operation is detected on a data object 130, that data object 130 may thereby be determined to be part of the working set 135. The records 160 may be generated and stored in real time, e.g., synchronously with respect to the detected operations on the data objects 130 in some embodiments, and may be stored asynchronously with respected to the detected operations in other embodiments. No user-initiated or administer-initiated scheduling or explicit requests may be required to generate and/or store the records 160 in some embodiments; that is, users of primary host 110 may be unaware of the detection of operations on data objects 130 and the generation and storage of corresponding records 160 in such embodiments. Any combination of different types of records 160 may be stored at the peripheral memory device 140 in various embodiments: e.g., a record 160 may be a full version or copy of a data object 130, an incremental version that only includes changes to the data object 130 since a previous record was created for the same data object, a compressed version, an encrypted version, a compressed and encrypted version, and so on. In one embodiment, a copy of a data object 130 may be stored as a record 160 in response to detecting a delete operation requested on the data object. In some embodiments, not all the memory of peripheral memory device 140 may be dedicated for data protection purposes: e.g., the peripheral memory device may comprise a portion of memory for storing records 160, and another portion of memory for general purpose use by users of the primary host 110. In some implementations the portion of the peripheral memory device 140 that is dedicated for records 160 may be protected from writes by a user of the primary host: e.g., administrative privileges may be required to write to the portion designated for records 160.

Each of the data objects 130 on which the operations are detected may be recoverable from a set of one or more of the records 160 stored at the peripheral memory device 140 in one embodiment. The availability characteristics (e.g., failure rates, failure distributions over time, set of possible sources of failure, etc.) of the peripheral memory device 140 may be independent of the availability characteristics of the primary host 110 in some embodiments—e.g., a system crash or a disk crash at primary host 110 may not affect the availability of peripheral memory device 140. In addition, in some embodiments the peripheral memory device may provide uniform and highly efficient random I/O performance to any part of its address space: e.g., the response time for writing to any address at the peripheral memory device may not vary with the address. By saving records 160 at the peripheral memory device 140, the WSPM 120 may ensure that the data objects that may be needed to perform tasks at the primary host 110 can be restored on short notice, even during time periods when the secondary backup device 180 is inaccessible from the primary host 110. The records 160 may help protect data objects 130 from a variety of different types of potential failures or errors, including, for example, system crashes, disk failures, malicious software attacks, inadvertent overwrites or deletions (i.e., human error), and so on. For example, if a disk on the primary host fails, a replacement disk may be inserted and the working set 135 may be quickly restored from one or more records 160 at the peripheral memory device 140; alternatively, if a user inadvertently deletes or modifies an important file from primary host 110, the file may be quickly reconstructed using one or more records 160 at the peripheral memory device 140. In embodiments where each write operation performed on a data object 130 results in a corresponding record 160 being created at the peripheral memory device, continuous protection of data objects 130 may be supported by WSPM 120—that is, it may be possible to recover the state of a data object 130 to any desired point of time. Continuous protection may provide the additional advantage of spreading the overhead associated with data protection over time: e.g., since each data modification is protected at the time it occurs or very shortly after it occurs, the processing and I/O required for generating the records 160 is not concentrated during specific backup periods, and therefore may not result in as much of a perceptible overhead to users as some conventional backups.

The total amount of memory available at peripheral memory device 140 may be small compared to the storage available at primary host 110 in some embodiments—for example, in one implementation, the peripheral memory device may be a one-gigabyte flash drive connected via a Universal Serial Bus (USB) port (interface 145) to the primary host, and the primary host may include an 80-gigabyte disk drive. Accordingly, the memory used for records 160 may have to be freed or reclaimed from time to time. In contrast to the peripheral memory device 140, the secondary backup device 180 (which may for example include one or more disks, disk arrays, tape devices, tape arrays and the like) may comprise a large amount of storage, typically capable of fully backing up a plurality of primary computer hosts 110. In one embodiment, WSPM 120 may be configured to detect backup operations from the primary host to the secondary backup device 180, and mark one or more records 160 for deletion in response to detecting a backup operation. A completion of a backup operation may indicate that the contents of a working set 135 for which corresponding records 160 were created are now protected at secondary backup device 180, and as a result records 160 no longer have to be retained at the peripheral memory device 140. In one embodiment, the WSPM 120 may be configured to verify, before marking a record 160 for deletion, that a backup of changes represented by the record 160 has been successfully completed to secondary backup device 180. In some embodiments memory used for records 160 may be reclaimed or freed asynchronously with respect to the detected backup: e.g., instead of freeing memory corresponding to records 160 as soon as the backup is detected, WSPM 120 may free the memory corresponding to the marked records 160 on an as-needed basis when space for newly generated records is required. In one embodiment, as described below in further detail, some records 160 may be selected for reclamation/freeing in preference to other records 160, e.g., based on a record retention policy that takes into account the type of operation that led to the creation of the records, their age, etc.

In some embodiments, the peripheral memory device 140 may be physically linked (e.g., by a cable, a connector such as a USB port, an IEEE 1394 (Firewire) port, or some other physical interface 145) to the primary host 110. In other embodiments, the peripheral memory device 140 may not be physically linked to the primary host 110. In some such embodiments, WSPM 120 may be configured to utilize any suitable wireless and/or infra-red communication protocol such as Bluetooth or IrDA (an Infra-red Data Association protocol) to communicate with the peripheral memory device 140. Non-volatile randomly accessible memory within independent, external devices used for a variety of functions, such as a personal digital assistant (PDA), a mobile phone, a camera, a watch or a pen may be used by WSPM 120 to store records 160 corresponding to operations detected at data objects of primary host 110 in some embodiments. In some implementations, WSPM 120 may be configured to use a single peripheral memory device 140 to store records 160 for data objects 130 of two or more primary hosts 110, e.g., using wireless links from the two or more primary hosts to the peripheral memory device 140. Thus, peripheral memory device 140 may be incorporated within any of a wide variety of devices in different embodiments. Peripheral memory device 140 may be relatively inexpensive in some embodiments, especially when compared to the primary host 110 or to conventional secondary backup devices 180 such as disks, disk arrays, or tape-based backup devices. In some embodiments, WSPM 120 may be configured to dynamically search for peripheral memory devices 140 accessible from primary host 110 at which space is available to store records 160, and select one or more of the peripheral memory devices found as a target for storing records 160. E.g., if WSPM 120 finds a USB-connected flash memory drive, as well as a memory device accessible from the primary host 110 within a mobile phone owned by the user of primary host 110, in one embodiment the WSPM 120 may be configured to notify the user of the found devices, and may obtain approval from the user to use one or both of the devices to provide data protection for data objects of the primary host 110.

Figure 2:
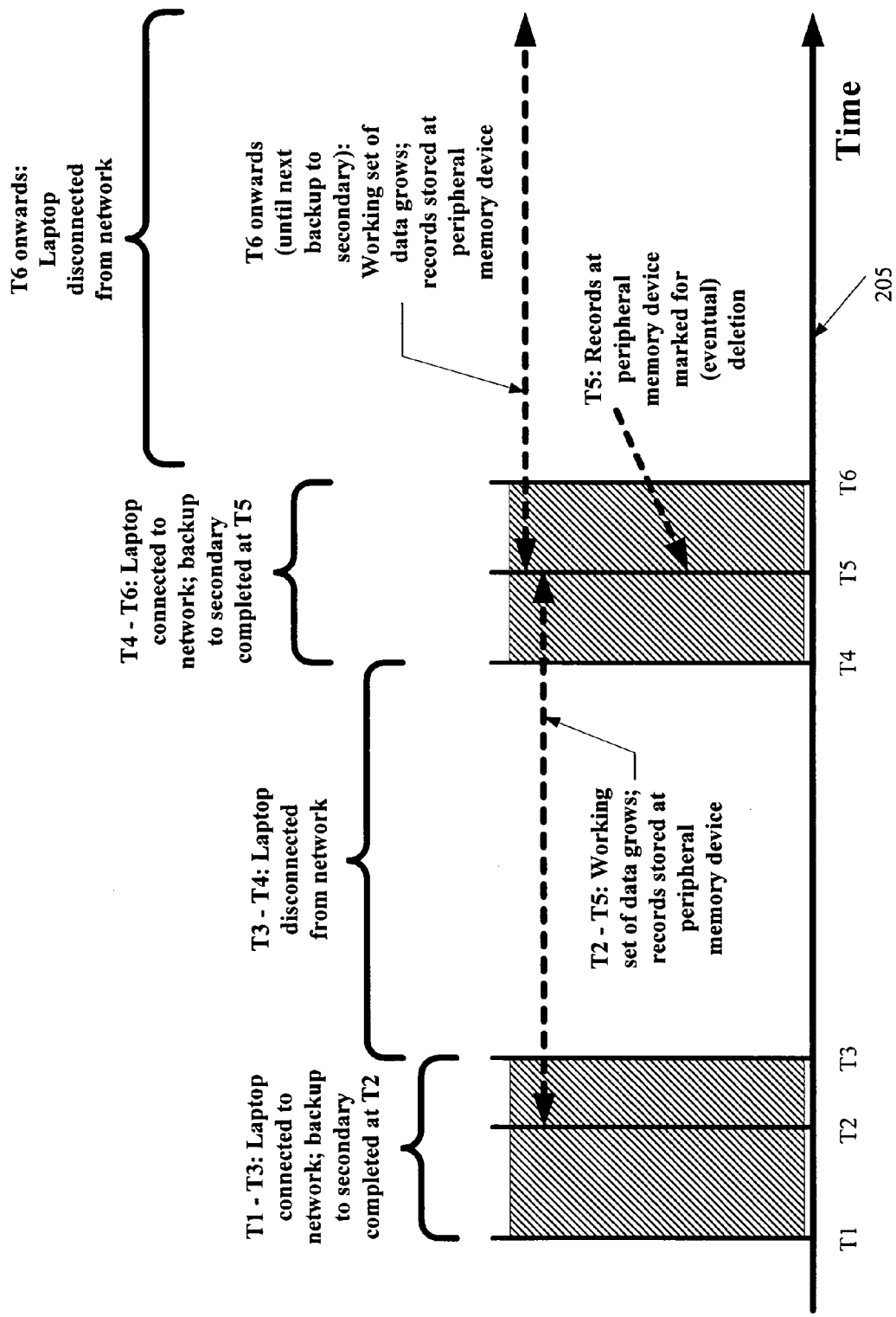
FIG. 2 illustrates an exemplary time sequence of data protection operations and working set changes for data objects at a laptop primary host, according to one embodiment.

FIG. 2 illustrates an exemplary time sequence of data protection operations and working set 135 changes for data objects 130 at a laptop primary host 110, according to one embodiment. Six points of time T1-T6 are illustrated on a time line 205. The laptop 110 is connected to a network 190 between T1 and T3, and also between T4 and T6; however, between T3 and T4, and between T6 and the end of the illustrated time period, the laptop 110 does not have connectivity to the network 190. In the depicted embodiment, connectivity to the network 190 is required for backups to a secondary backup device 180. As shown, backup to the secondary device 180 are completed at times T2 and T5. During the time period T2-T5, as users perform various tasks using the laptop 110, the working set 135 at the laptop grows, and the WSPM 120 stores records 160 at a peripheral memory device 140 corresponding to detected operations on data objects 130 of the working set 135. In some embodiments, enough records 160 may be generated between T2 and T5 to fill more memory than is available at the peripheral memory device 140 for the records; in such a scenario, at least some of the records 160 may have to be reclaimed or deleted from the peripheral memory device 140 between T2 and T5. At T5, the WSPM 120 detects an occurrence of a backup, and marks some or all of the current set of records 160 on the peripheral memory device for deletion. In some embodiments, the records 160 may be deleted as soon as the backup at T5 is detected, while in other embodiments, some or all of the records may be deleted later, e.g., if and when space for new records 160 (generated in response to operations performed after T5) is needed on the peripheral memory device 140.

After T5, the working set 135 (which may be considered to be empty as a result of the backup at T5) again starts growing, repeating a pattern of working set growth observed between T2 and T5 until the next backup operation is performed to secondary backup device 180. If any data of a working set 135 that is not yet protected by a backup to secondary backup device 180 is lost, it may be recoverable from the peripheral memory device 140; thus, data objects 130 may be recovered to a desired state, either from secondary backup device 180, or from the peripheral memory device 140. As noted above, the detection of operations at data objects 130 of the laptop 110, and the storage of records 160 corresponding to the operations, may be completely transparent to the user of laptop 110. By automatically storing records 160 on an inexpensive and high-performance peripheral memory device 140 in response to detected operations on data objects of the primary host, performing backups to secondary device 180, and utilizing limited storage on the peripheral memory device 140 efficiently based on detected backups to the secondary device 180, WSPM 120 and backup manager 170 together may provide a cost-effective, user-friendly and comprehensive data protection package for primary host 110 in the embodiments depicted in FIG. 1 and FIG. 2. The functionality provided by the WSPM 120 may also facilitate rapid recovery of objects that may have been referenced or read recently, but may not necessarily have been updated recently, thus allowing a user to reestablish the full set of data objects 130 he/she may need to perform a task, even during time windows when the primary host 110 is disconnected from a corporate network 190 typically required for backup.

Figure 3:
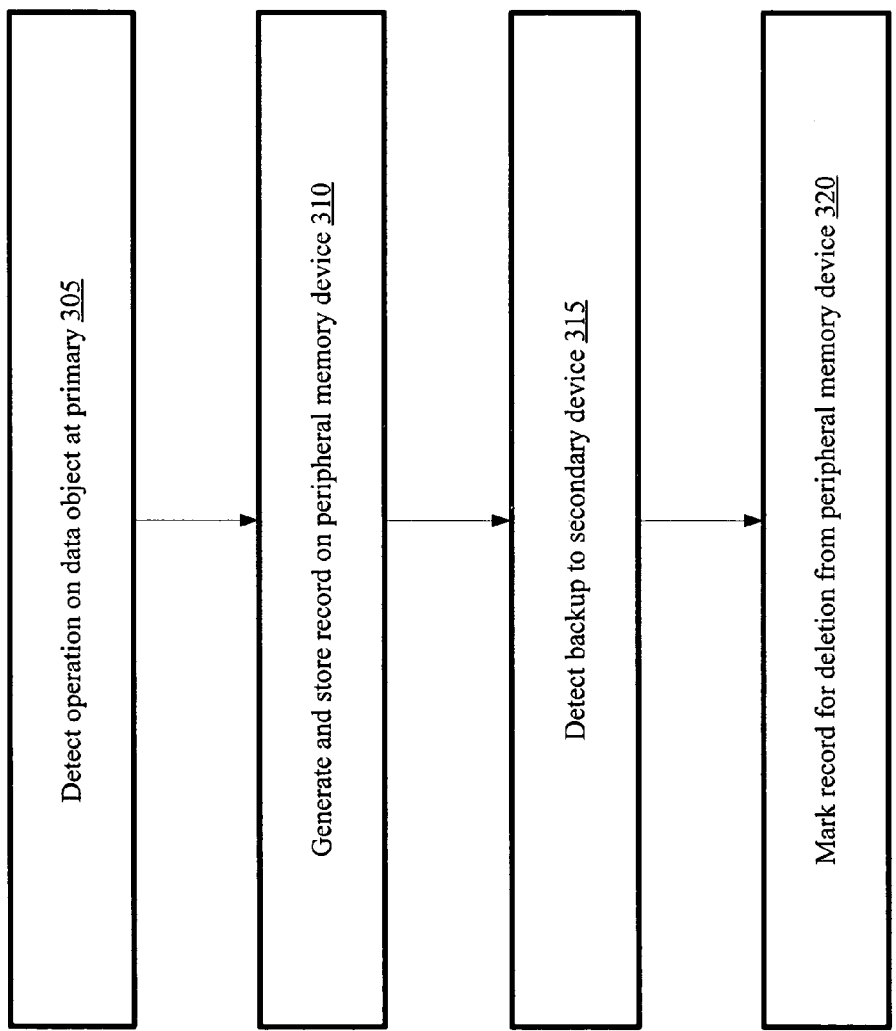
FIG. 3 is a flow diagram illustrating aspects of the operation of a working set protection manager, according to one embodiment.

FIG. 3 is a flow diagram illustrating aspects of the operation of WSPM 120 according to one embodiment. As shown in block 305, the WSPM 120 may be configured to detect an operation (such as a read or write I/O operation) performed on a data object 130 at a primary host 110. In an embodiment where the data objects 130 are files managed by a file system, for example, the WSPM 120 may comprise a file system filter driver, i.e., a kernel-mode software component that attaches to a file system in order to intercept and/or perform processing on I/O operations performed using that file system. In such an embodiment, any operation that invokes an application programming interface (API) supported by a file system, such as a file open, read, write or close operation, may be detected by the file system filter driver, and the file system filter driver may for example be configured to perform additional operations for some or all of the detected operations. The WSPM 120 may be configured to generate and store a record 160 corresponding to the detected operation at the peripheral memory device 140, as depicted in block 310. When a backup operation to a secondary backup device 180 is performed or completed, the WSPM 120 may be configured to detect the backup (block 315), and mark the record 160 for deletion in response to detecting the backup (block 320). In some embodiments, for example, a backup manager 170 may be configured to send a notification to the WSPM 120 when a backup to secondary storage is performed or completed. In other embodiments, the WSPM may be configured to send a query (e.g., periodically) to a backup manager 170 to determine whether a new backup has been completed, or may be provided access to a backup schedule being used by backup manager 170. As noted above, a record 160 identified or marked for deletion may not actually be deleted until later by the WSPM 120, e.g., when space for a new record 160 is needed at the peripheral memory device.

Figure 4:
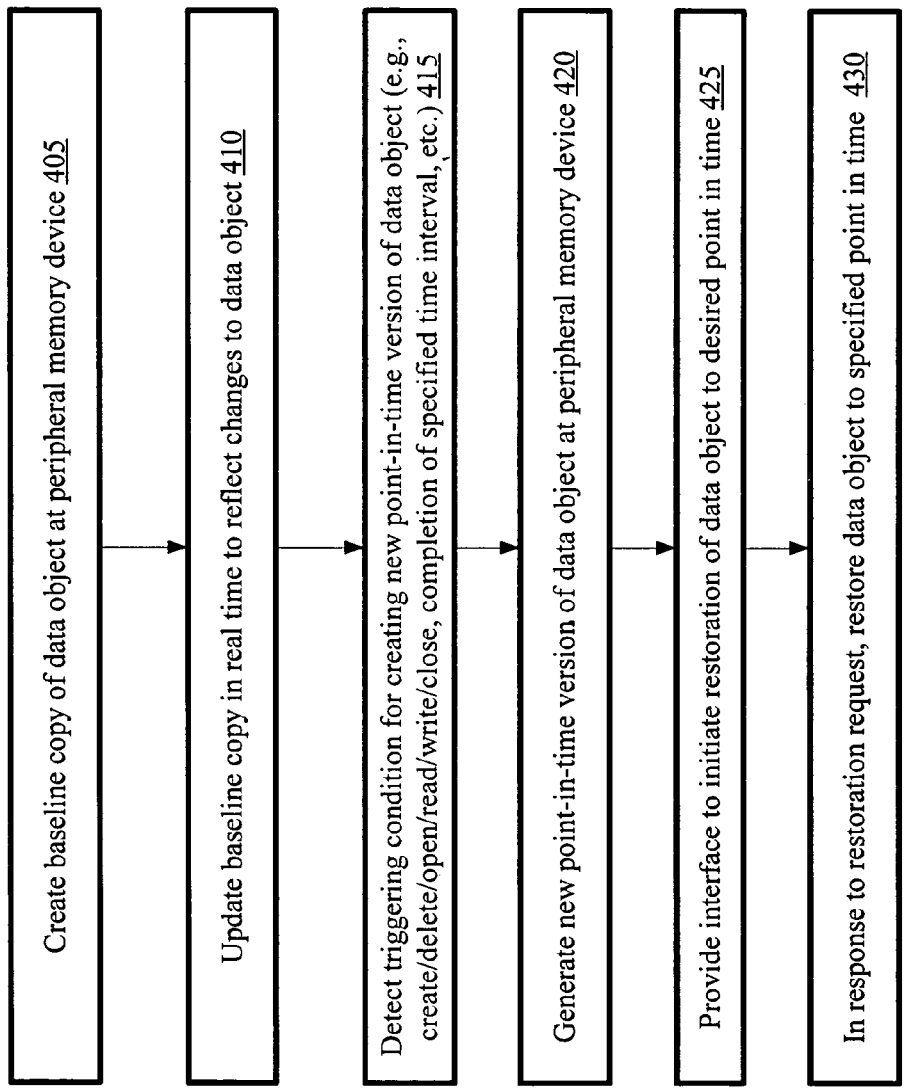
FIG. 4 is a flow diagram illustrating further aspects of the operation of a working set protection manager, according to one embodiment in which the working set protection manager may be configured to create a plurality of point-in-time versions of a data object at a peripheral memory device.

FIG. 4 is a flow diagram illustrating further aspects of the operation of WSPM 120, according to one embodiment in which the WSPM 120 may be configured to create a plurality of point-in-time versions of a data object 130 at peripheral memory device 140. In the depicted embodiment, the records 160 of FIG. 1 may be implemented, for example as baseline copies of data objects, representations of modifications to the baseline copies, and/or as additional point-in-time copies (which may also be termed replicas) created from time to time. As shown in block 405, the WSPM 120 may be configured to first establish a baseline copy (such as a full copy) of a data object 130 of the primary host 110 at the peripheral memory device 140, unless a copy already exists at the peripheral memory device 140. A number of different conditions may result in the establishment of the baseline copy in various embodiments. For example, a baseline copy may be stored in response to a creation of a new data object 130, in response to a first read or write operation to the data object 130 since a backup to a secondary backup device 180, or in response to a first read or write operation since a record 160 corresponding to the data object 130 was deleted from the peripheral memory device 140. After the baseline copy has been established, whenever a change is detected on the data object 130, the WSPM 120 may be configured to apply that change in real time (e.g., synchronously with respect to the operation that results in the change at the primary host 110) to the baseline copy at the peripheral memory device (block 410). It is noted that in some embodiments, the change to the baseline copy may be applied asynchronously with respect to the operation that results in the change at the primary host. In some embodiments, e.g., for large data objects 130, a baseline copy may not be created—instead, only changes to the data objects may be stored as records 160. For such large objects, recovery may require access to a backup stored at secondary backup device 180.

In the depicted embodiment, in addition to modifying the baseline copy as described above, the WSPM 120 may also be configured to create additional point-in-time versions (such as full replicas) of data objects 130, which may for example further reduce the time taken to restore the data object to a desired state. In response to a detection of a triggering condition, such as a create, open, close, read, write, delete or save operation performed by a user on the data object 130 or a completion of a configurable time interval since the last point-in-time copy was created (block 415), the WSPM 120 may generate a new point-in-time copy and store the copy at the peripheral memory device 140 (block 420). In some implementations, the point-in-time copies may be space-efficient, e.g., a point-in-time replica may comprise a representation of changes to the corresponding data object 130 since the previous point-in-time image was created, and may not include a full copy of the data object 130. In one implementation, e.g., in order to reduce the total amount of memory consumed at the peripheral memory device 140, WSPM 120 may be configured to limit the total number of point-in-time copies of a data object 130 that are retained at any given time on peripheral memory device 140—e.g., if at most N copies are to be retained, and N copies are currently present at the peripheral memory device 140, WSPM 120 may be configured to delete a selected copy (such as the oldest copy) before adding a new copy to the peripheral memory device 140. In some embodiments, one or more parameters governing the creation of the point-in-time copies and/or the baseline copy of a data object 130 may be configurable by a user or administrator: for example, a user may be allowed to specify the time interval between successive point-in-time copies, the kinds of operations that are to trigger the generation of point-in-time copies, and the like.

WSPM 120 may be configured to provide one or more interfaces to allow a user to initiate restoration of a desired set of data objects 130 in some embodiments (block 425). For example, a user may be allowed to select a directory or a set of files by name or location and specify a desired time to which the selected objects are to be restored. In response to input received via the restoration interface, the WSPM 120 may be configured to restore the specified data objects to their state as of the desired time (or to as close a time as possible to the desired time) (block 430). In one embodiment, the user may not be required to identify a set of data objects 130 to be restored: instead, the user may simply indicate a time or a time period to which the state of the primary host 110 is to be restored, and the WSPM 120 may be responsible for determining the set of data objects 130 that have to be recovered, and then for restoring the data objects 130 from records 160.

In some situations, the WSPM 120 may be configured to utilize services provided by backup manager 170 to recover the desired set of data objects 130—e.g., if the restoration request is received at a time when the backup manager 170 and the secondary backup device 180 are accessible from the primary host 110, and if the set of data objects 130 cannot be fully recovered from the peripheral memory device 140 alone. In one implementation, in response to a restoration request specifying a desired point of time to which recovery is requested by a user, the WSPM 120 may be configured to indicate to the user the closest point in time (i.e., closest to the desired time) to which one or more data objects 130 can be restored. A variety of different restoration interfaces may be supported in different embodiments, including any desired type of graphical user interface (GUI), command-line interface, or voice-driven interface (e.g., the user may initiate restoration verbally in some embodiments).

The WSPM 120 may also be configured to provide hints, suggestions or recommendations to the user to change configuration settings (or other parameters such as the size of the peripheral memory device 140) to reduce the difference between the desired recovery point (i.e., the point in time to which restoration was requested) and the achieved recovery point (i.e., the point in time to which restoration was accomplished). For example, the WSPM 120 may recommend replacing the current peripheral memory device 140 with a peripheral memory device with more memory (or increasing the fraction of memory at the current peripheral memory device 140 that is specifically dedicated to records 160), and may also recommend a configuration setting change to ensure that new point-in-time copies are generated more frequently. In one embodiment, the WSPM 120 may be configured to track restoration performance, e.g., to track differences between desired and achieved recovery points over time, and automatically tune one or more settings to improve one or more performance metrics. In some embodiments, the WSPM 120 may be configured to proactively identify objects that may be restored: e.g., the WSPM 120 may detect when a record 160 or version of a data object at the peripheral memory device 130 is newer than any corresponding version of the data object at the primary host 110, and may display a list of such data objects as possible restoration candidates to a user of primary host 110.

In some embodiments, the WSPM 120 may be configured to use one or more encryption techniques and/or compression techniques to store records 160 at the peripheral memory device 140, such as the baseline copies and the point-in-time copies described above. The decision as to whether any or all of the records stored at the peripheral memory device 140 are to be encrypted and/or compressed may also be based on configurable parameters in one embodiment: e.g., by default, records 160 may be stored in encrypted and compressed format, and the user may be allowed to specify that records corresponding to some or all data objects (e.g., objects in a particular directory) are not to be encrypted and/or not to be compressed. In some embodiments, as noted above, users may also specify to WSPM 120 a specific subset of data objects for which continuous data protection of the type described above is desired or not desired: e.g., a user may indicate that only data objects 130 in a directory "C:\work" are to be protected using records 160 at peripheral memory device 140, or that data objects 130 in a directory "C:\temp" are not to be protected.

Figure 5:
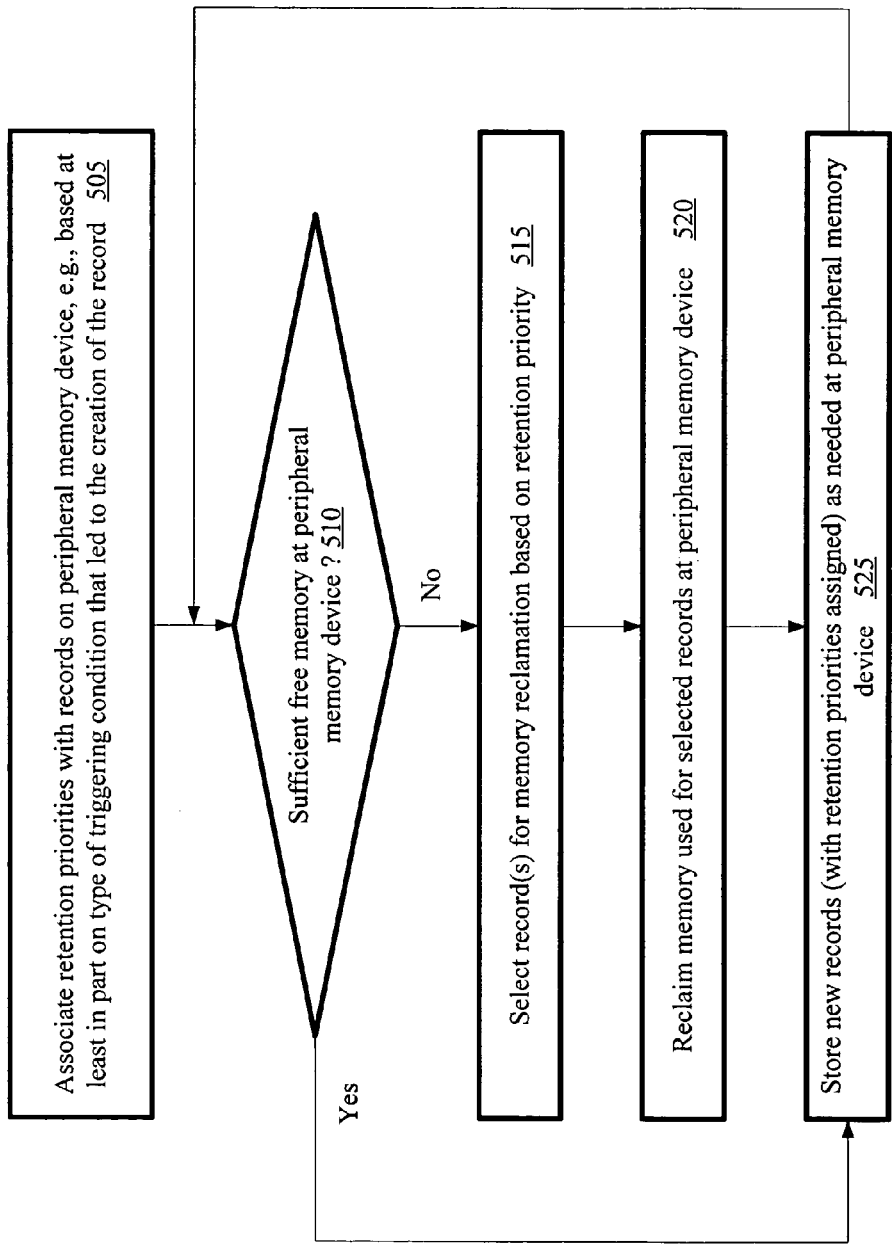
FIG. 5 is a flow diagram illustrating aspects of the operation of a working set protection manager according to an embodiment in which the working set protection manager is configured to use retention priorities assigned to records at a peripheral memory device to determine which records should be deleted or reclaimed.

FIG. 5 is a flow diagram illustrating aspects of the operation of WSPM 120 according to an embodiment in which, in accordance with a record retention policy, the WSPM is configured to use retention priorities assigned to records 160 at peripheral memory device 140 to determine which records 160 should be deleted or reclaimed. As described earlier, each record 160 stored at the peripheral memory device 140 may be generated in response to a particular triggering condition (such as file creation, a file open/close/read/write operation, etc.). As shown in block 505 of FIG. 5, the WSPM 120 may be configured to associate a retention priority with each record 160 that is based at least in part on the type of triggering condition that led to the creation of the record. For example, corresponding to a particular data object 130, at a given point in time there may be five records 160A-160E at the peripheral memory device 140. Record 160A may comprise the updated baseline copy of the data object 130 (i.e., a copy to which changes are applied in real time as the changes occur at the primary host 110), and records 160B-160E may comprise point-in-time copies generated every ten minutes based on a configurable replication policy, with 160E being the oldest point-in-time copy, and 160B the newest. In this example scenario, the WSPM 120 may be configured to assign a higher retention priority to record 160A than to records 160B-160E, so that, for example, if memory constraints require the deletion or reclamation of at least one of the records 160A-160E, record 160A is more likely to be retained in preference to records 160B-160E. In addition, within the set of records 160B-160E that were generated as a result of similar triggering conditions, the WSPM 120 may also assign a higher retention priority to the some of the records: e.g., record 160B may be assigned a higher retention priority than record 160E, since it is a more recent point-in-time copy. Other factors may also be taken into account when assigning retention priorities to records 160 in some embodiments—e.g., users may designate some sets of data objects 130 (e.g., files in a folder "C:\temp") as being less important or less valuable than other data objects 130 (e.g., files in a folder "C:\work"), and the records 160 associated with the data objects may be assigned retention priorities that take the user's importance indications into account. In one embodiment, retention priorities for records 160 may be based at least in part of a type or classification of the corresponding data objects 130: e.g., records corresponding to data objects 130 that are identified as source code objects (e.g., based on a file name extension such as ".c" or ".java") may be assigned higher retention priorities than records for other data objects identified as object files (which may be derivable from the source code files and may therefore be considered less critical).

It is noted that the association of retention priorities with records 160 may be independent of the marking of records 160 for deletion based on a detection of backup operations in some embodiments. For example, records 160 that are not currently marked for deletion as well as records 160 that have been marked for deletion may have retention priorities associated with them in one embodiment. In another embodiment, only records 160 that have been marked for deletion may be assigned retention priorities. In yet another embodiment, only records 160 that have not been marked for deletion may have associated retention priorities, and records 160 that have been marked for deletion may be considered to have a lower retention priority than the unmarked records 160. Under some circumstances, e.g., as a result of very heavy write workloads on the primary host 110 while the primary host 110 is disconnected from backup manager 170 in one embodiment, WSPM 120 may be forced to reclaim memory space corresponding to records 160 that have not yet been marked for deletion. In such circumstances, for example, retention priorities may be used to select records 160 for reclamation even if no backup to the secondary backup device 180 has been performed for the corresponding data object 130 since the records were generated. It is also noted that while in some embodiments, an explicit indicator of a retention priority for each record 160 may be maintained or stored by WSPM 120, in other embodiments, the retention priority may be implicit (i.e., a value of a retention priority may not be stored anywhere, but may be derived or determined as needed). The retention priority of a given record 160 may change over time in some embodiments: e.g., as a point-in-time copy ages, its retention priority may be reduced. In some embodiments, WSPM 120 may be configured to request user intervention under exceptional circumstances to identify records that are to be reclaimed—e.g., in one scenario, under tight memory constraints, if all the remaining records 160 currently stored at the peripheral memory device 140 have equal retention priorities and all the records are unmarked, a user may be asked to identify which of the existing records 160 should be reclaimed to free memory needed for a new record.

As shown in decision block 510, the WSPM 120 may be configured to determine, e.g., either as a background task or in response to a generation of a new record, whether sufficient space is available at the peripheral memory device 140. If sufficient free memory is available, new records may be stored at the peripheral memory device (block 525) as needed, and space availability at the peripheral memory device may again be checked periodically or based on a triggering condition (as illustrated by the arrow from block 525 back to decision block 510). If, however, sufficient memory is not available (as also detected in block 510), the WSPM 120 may be configured to select one or more records 160 for memory reclamation based at least partly on the retention priorities associated with the records (block 515), and reclaim memory corresponding to the selected records (block 520). In some embodiments, the WSPM 120 may be configured to proactively reclaim at least a portion of memory within a peripheral memory device 140, e.g., based on configurable parameters. For example, WSPM 120 may be configured to ensure that between 20% and 30% of the space at peripheral memory device 120 is available for new records, so that delays associated with reclaiming memory are avoided when a new record 160 has to be written to the peripheral memory device 140. In some embodiments, the operations corresponding to blocks 510, 515 and 520 may be performed as a background task by WSPM 120. In one embodiment WSPM 120 may be implemented using a plurality of threads, and one or more of the threads may be configured to ensure that sufficient memory space remains available at the peripheral memory device 140 to accommodate new records 160 without incurring extensive delays.

Figure 6:
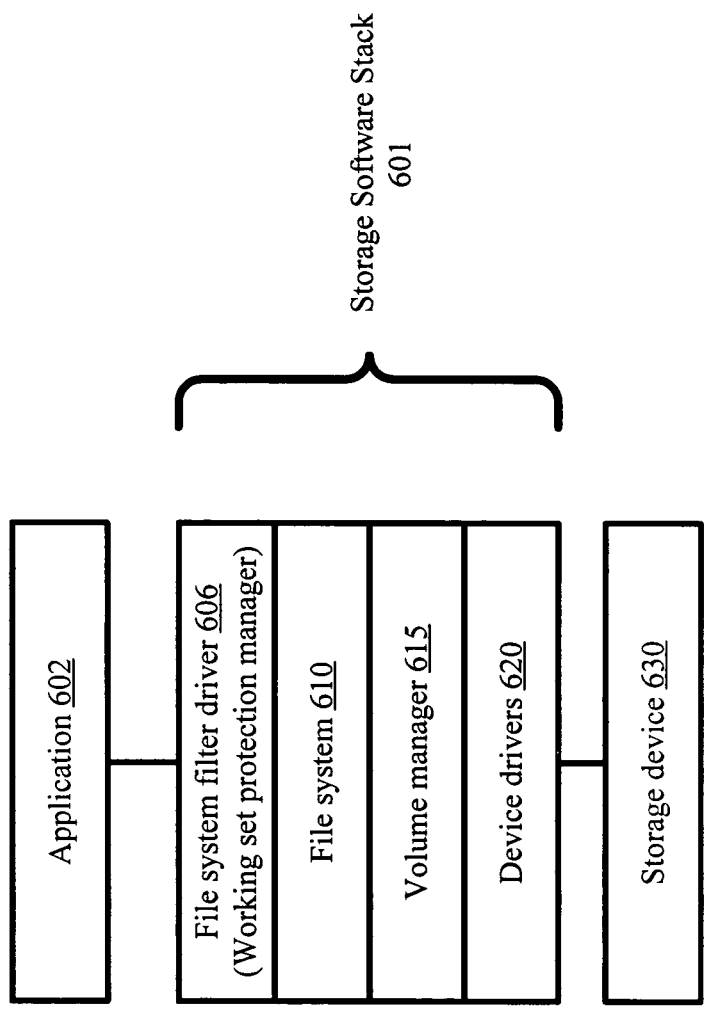
FIG. 6 is a block diagram illustrating an embodiment in which at least a portion of a working set protection manager may be implemented as a file system filter driver.

Portions of WSPM 120 may be implemented at various levels within a software stack in use at the primary host 110 in different embodiments. FIG. 6 is a block diagram illustrating an embodiment in which WSPM 120 may be implemented as at least a portion of a file system filter driver 606 within a storage software stack 601. The storage software stack 601 may, for example, include a file system layer 610, a volume manager layer 615, and a device driver layer 620, and the functionality of the storage software stack may be invoked from an application 602 to access storage devices 630. In the depicted embodiment, the file system filter driver may 606 be a kernel-mode software component that attaches to a file system 610 in order to intercept and/or perform processing on I/O operations performed using that file system. As shown, the file system filter driver 606 may be included between an application 602 and the file system 610 in the storage software stack 601. When an application 602 issues an I/O request, such as an open, create, close, read, or write request, on a file or directory managed by the file system 610, the file system filter driver 606 may intercept or detect the request and may perform one or more functions, such as generating a record 160 at peripheral memory device 140 in the embodiment shown in FIG. 6. In one embodiment, the file system filter driver 606 may also be configured to support additional functionality (e.g., logging certain types of operations, monitoring performance of operations, etc.) other than the functionality of WSPM 120. In other embodiments, at least a portion of the WSPM 120 may be implemented at other layers in the storage software stack, e.g., within one of the depicted layers (e.g., the file system 610, the volume manager 615 or the device driver layer 620), or between a pair of the other layers (e.g., between the file system 610 and the volume manager 615, between the volume manager 615 and the device drivers 620, or between the device drivers 620 and the storage device 630). In one embodiment, at least a portion of the WSPM 120 may be implemented entirely in application space, e.g., as a module of an application 602. In some embodiments, the functionality of the WSPM 120 may be implemented using a plurality of cooperating modules, including for example one or more modules at various levels of storage software stack 601 the primary host 110, one or more modules at the peripheral memory device 140, and/or one or more modules accessible from the primary host via a network 190. In some implementations, WSPM 120 may be a component of backup manager 170: e.g., backup manager 170 may include working set protection as an optional or default feature, and one or more software modules configured to provide the functionality of WSPM 120 may be installed as part of backup manager 170 installation. WSPM 120 may be implemented to be independent of the underlying operating system and/or hardware platform in some embodiments.

In some embodiments, WSPM 120 may also be configured to support additional functionality related to data protection. For example, if WSPM 120 is unable to detect a peripheral memory device 140 suitable for storing records 160 as described above, in one embodiment WSPM 120 may be configured to generate a warning, such as a pop-up window, an audio message, or a graphic, to the user of primary host 110. In another embodiment, the WSPM 120 may be configured to detect one or more environmental conditions, such as a low level of remaining battery power at a laptop primary host 110, and adapt its functionality accordingly. For example, if low battery power is detected, in one embodiment, depending on a configuration setting, WSPM 120 may increase or decrease the frequency at which records 160 are stored at the peripheral memory device 140, or may automatically change the set of triggering conditions that result in new records 160 being stored at the peripheral memory device 140. In another embodiment, the type of records 160 generated and stored at the peripheral memory device 140 may be dependent on the size of the corresponding data object 130: e.g., for very large data objects, only changes or deltas may be stored at the peripheral memory device 140, while full copies may be stored at the secondary backup device 180; while for smaller data objects, full copies may be stored at the peripheral memory device 140. In response to a restore request, e.g., for large objects for which only changes or deltas are available at the peripheral memory device 140, the WSPM 120 may be configured to utilize objects such as full copies stored at the secondary backup device 180, in addition to or instead of one or more records 160 stored at the peripheral memory device 140 in some embodiments.

In one embodiment, WSPM 120 may provide one or more interfaces (e.g., configuration files, graphical user interfaces, and/or web-based interfaces) to receive configuration information from a user to control various aspects of the WSPM's functionality. The interfaces may be used, for example, to specify data objects 130 for which records 160 are to be stored on the peripheral memory device, to specify policies to generate the contents of the records (e.g., whether full copies are to be stored as records 160 or deltas are to be stored), to specify policies for reclaiming storage at the peripheral memory device 140, etc. Thus WSPM 120 may support a variety of levels of user interaction in different embodiments, from embodiments in which the WSPM 120 is completely transparent to the user (e.g., where users may not even be aware of the functionality of WSPM 120) to embodiments in which users may direct or control the operation of WSPM 120 by specifying various configuration parameters or requesting specific operations explicitly.

Figure 7:
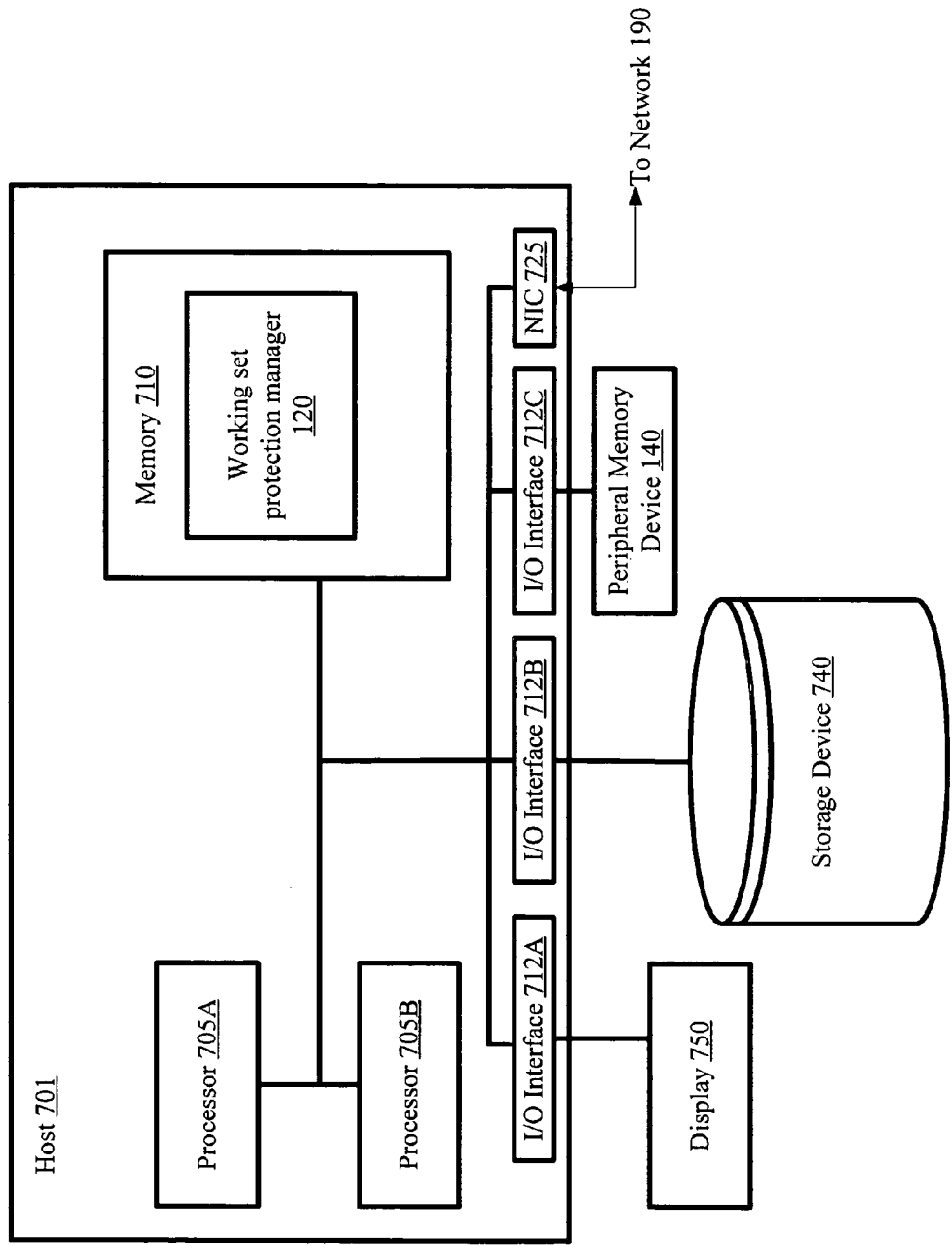
FIG. 7 is a block diagram of a computer host, according to one embodiment.

FIG. 7 is a block diagram of a computer host 701 that may be configured to serve as primary host 110, according to one embodiment. As shown, host 701 may include one or more processors 705, such as processors 705A and 705B. In various embodiments, processors 705 may be implemented using any desired architecture or chip set, such as the SPARC™ architecture from Sun Microsystems or the x86-compatible architectures from Intel Corporation, Advanced Micro Devices, etc. Program instructions that may be executable to implement the functionality of the WSPM 120 described above may be partly or fully resident within a memory 710 at a given point in time, and may also be stored on a storage device 740 (which may also store data objects 130). Memory 710 may be implemented using any appropriate medium such as any of various types of RAM (e.g., DRAM, SDRAM, RDRAM, SRAM, etc.). In addition to processors 705 and memory 710, host 701 may also include one or more I/O interfaces 712, such as I/O interface 712A to a display device 750, I/O interface 712B providing access to storage devices 740, I/O interface 712C providing access to peripheral memory device 140, one or more network interface cards (NICs) 725 providing access to a network, and the like. Any of a variety of storage devices 740 may be used to store the instructions as well as data for WSPM 120 in different embodiments, including any desired type of persistent and/or volatile storage devices, such as individual disks, disk arrays, tape devices, optical storage devices such as CD-ROMs, CD-RW drives, DVD-ROMs, DVD-RW drives, flash memory devices, various types of RAM and the like. One or more storage devices 740 may be directly coupled to host 701 in some embodiments (e.g., using the Small Computer Systems Interface (SCSI) protocol), or may be accessible over any desired storage interconnect such as iSCSI (internet SCSI), a fiber channel fabric or storage area network (SAN) in other embodiments. A storage device 740 may include holographic media in some embodiments. Part or all of data objects 130 and/or backups 185 may be stored on any desired type of storage device 740. As noted earlier, peripheral memory device 140 may be linked to host 701 using any desired communication or storage protocol, and any suitable physical or wireless interface in different embodiments, including for example, a USB port, an IEEE 1394 (Firewire) port, Ethernet, Fibre Channel, etc.

In addition to WSPM 120, memory 710 and/or storage devices 740 may also store operating systems software, software for storage stack 601 and/or software for various applications 602 in various embodiments. In some embodiments, WSPM 120 may be included within an operating system, a storage management software product such as a backup manager 170, or another software package, while in other embodiments, WSPM 120 may be packaged as a standalone product. In some embodiments, component modules of WSPM 120 and/or backup manager 170 may be distributed across multiple hosts 701, or may be replicated at a plurality of hosts. In one embodiment, part or all of the functionality of a WSPM 120 and/or backup manager 170 may be implemented via one or more hardware devices (e.g., via one or more Field Programmable Gate Array (FPGA) devices) or in firmware.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system, comprising:
 a primary host;
 a peripheral memory device;
 a working set protection manager;
 wherein the working set protection manager is configured to:
  detect an operation performed on a data object at the primary host;
  store a record associated with the operation at the peripheral memory device in response to detecting the operation; and
  in response to a detection of a backup operation from the primary host to a secondary backup device, mark the record for deletion from the peripheral memory device;
 wherein the working set protection manager is further configured to provide an interface to receive configuration information including one or more of (a) an identification of one or more data objects, including the data object, for which records are to be stored at the peripheral memory device, (b) an indication of a policy for generating contents of one or more records including the record stored at the peripheral memory device, and (c) an indication of a policy for reclaiming storage at the peripheral memory device in response to a detection of insufficient space at the peripheral memory device.

2. The system as recited in claim 1, wherein the working set protection manager is further configured to delete the record from the peripheral memory device.

3. The system as recited in claim 1, wherein the operation is a read operation.

4. The system as recited in claim 1, wherein the operation is a write operation.

5. The system as recited in claim 1, wherein the working set protection manager is further configured to:
 store a plurality of records including the record at the peripheral memory device, wherein each record of the plurality of records corresponds to a respective data object at the primary host and is generated in response to a respective triggering condition detected at the primary host.

6. The system as recited in claim 5, wherein the working set protection manager is further configured to:
 in response to a restoration request, restore the data object using at least one or more records of the plurality of records.

7. The system as recited in claim 6, wherein in response to the restoration request, the working set protection manager is further configured to use one or more objects stored at the secondary backup device to restore the data object.

8. The system as recited in claim 5, wherein the working set protection manager is further configured to:
 in response to a detection of insufficient space at the peripheral memory device, reclaim memory corresponding to one or more records of the plurality of records at the peripheral memory device in accordance with a record retention policy.

9. The system as recited in claim 8, wherein the record retention policy comprises an assignment of a retention priority to each record of the plurality of records.

10. The system as recited in claim 9, wherein the retention priority assigned to a particular record of the plurality of records is based at least in part on a type of the triggering condition that resulted in a generation of the particular record.

11. The system as recited in claim 9, wherein the retention priority assigned to a particular record of the plurality of records is based at least in part on a type of the data object with which the particular record is associated.

12. The system as recited in claim 5, wherein the triggering condition associated with a particular record of the plurality of records comprises at least one of a file create, a file delete, a file open, a file close, a file read, and a file write operation.

13. The system as recited in claim 5, wherein the triggering condition associated with a particular record of the plurality of records comprises a completion of a specified time interval since a previous record was stored on the peripheral memory device.

14. The system as recited in claim 1, wherein the peripheral memory device is linked to the primary host via a Universal Serial Bus (USB) interface.

15. The system as recited in claim 1, wherein the peripheral memory device is linked to the primary host via a wireless interface.

16. The system as recited in claim 1, wherein at least a portion of the peripheral memory device is housed within a telephony device.

17. The system as recited in claim 1, wherein the working set protection manager comprises at least a portion of a file system filter driver.

18. The system as recited in claim 1, further comprising the secondary backup device.

19. The system as recited in claim 1, wherein the peripheral memory device is a random access device, and wherein, in the event of a failure at the primary host resulting in a loss of access to the data object, the record stored at the peripheral memory device remains accessible.

20. A computer readable storage medium comprising program instructions, wherein the instructions are computer executable to implement a working set protection manager configured to:
    detect an operation performed on a data object at a primary host;
    store a record associated with the operation at a peripheral memory device in response to detecting the operation; and
    in response to a detection of a backup operation from the primary host to a secondary backup device, mark the record for deletion from the peripheral memory device;

wherein the working set protection manager is further configured to:
    store a plurality of records including the record at the peripheral memory device, wherein each record of the plurality of records corresponds to a respective data object at the primary host and is generated in response to a respective triggering condition detected at the primary host; and
    in response to a detection of insufficient space at the peripheral memory device, reclaim memory corresponding to one or more records of the plurality of records at the peripheral memory device in accordance with a record retention policy.

21. The storage medium as recited in claim 20, wherein the record retention policy comprises an assignment of a retention priority to each record of the plurality of records.

22. The storage medium as recited in claim 21, wherein the retention priority assigned to a particular record of the plurality of records is based at least in part on a type of the triggering condition that resulted in a generation of the particular record.

23. The storage medium as recited in claim 20, wherein working set protection manager comprises at least a portion of a file system filter driver.

24. A computer-implemented method, comprising:
    detecting one or more operations performed on a data object at a primary host;
    storing a plurality of records associated with the operation at a peripheral memory device in response to detecting the one or more operations, wherein each record of the plurality of records corresponds to a respective data object at the primary host and is generated in response to the one or more operations performed at the primary host; and
    in response to a detection of a backup operation from the primary host to a secondary backup device, marking the record for deletion from the peripheral memory device; and
    in response to a detection of insufficient space at the peripheral memory device, reclaiming memory corresponding to one or more records of the plurality of records at the peripheral memory device in accordance with a record retention policy.

25. The method as recited in claim 24, wherein the record retention policy comprises an assignment of a retention priority to each record of the plurality of records.

26. The method as recited in claim 25, wherein the retention priority assigned to a particular record of the plurality of records is based at least in part on a type of the triggering condition that resulted in a generation of the particular record.

27. The method as recited in claim 24, wherein said detecting an operation performed on said data object is performed at a file system filter driver at said primary host.

* * * * *